United States Patent Office 3,205,197
Patented Sept. 7, 1965

3,205,197
CURING OF ORGANOPOLYSILOXANES
Merrill Cohen and Charles B. Reilly, Marblehead, Mass., assignors to General Electric Company, a corporation of New York
No Drawing. Filed Dec. 30, 1960, Ser. No. 79,544
13 Claims. (Cl. 260—46.5)

This invention relates to curable organopoly-siloxane compositions and to the process for curing organopolysiloxanes. More particularly, the present invention relates to the curing of organopolysiloxanes by a catalyst system comprising an epoxy composition and an amine selected from the class consisting of primary amines, secondary amines and tertiary amines.

In the curing of organopolysiloxane compositions, particularly those compositions containing silicon-bonded hydroxyl groups, which organopolysiloxanes are referred to hereinafter for brevity as "silanol-containing organopolysiloxanes," both acidic and basic catalyst have been employed. For example, one of the common acidic catalysts employed in the curing of these compositions are the metal salts of organic carboxylic acids. While these organic carboxylic acid salts cure reactive organopolysiloxanes, the presence of the acid from the metal salt presents certain problems. For example, in the encapsulation of copper articles such as printed circuit boards with these acid catalyzed resins, it is found that the residue from the catalyst tends to discolor and corrode the surface of the copper, thereby impairing both the appearance and the performance of the encapsulated copper-containing material.

Among the basic catalysts which have been employed for the curing of silanol-containing organopolysiloxanes are the various quaternary ammonium compounds such as benzyltrimethyl ammonium hydroxide or tetramethyl ammonium acetate. While these basic catalysts cure the organopolysiloxanes, their use has presented certain problems. For example, both the quaternary ammonium compounds and the primary amines are difficult to handle because of toxicity problems. Furthermore, these materials often cause such a rapid cure of silanol-containing organopolysiloxane compositions that it is impossible to obtain a uniform cured material. Thus, with these extremely active basic catalysts, it is difficult to cure thick section materials to a void-free product.

The present invention is based on our discovery of a two component catalyst system for the curing of silanol-containing organopolysiloxanes which obviates all of the difficulties of the aforementioned curing systems. In particular, the curing catalyst system employed in the practice of the present invention comprises an organic compound containing an epoxy group and an amine selected from the class consisting of primary amines, secondary amines and tertiary amines. By an organic compound containing an epoxy group is meant a compound containing at least one epoxy group, i.e., a (1) 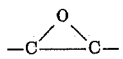

group.

The organopolysiloxane compositions to which the curing catalyst system of the present invention is applicable include any of the prior art organopolysiloxane compositions containing silicon-bonded hydroxyl groups which have heretofore been cured by metal salts of organic carboxylic acids or by quaternary ammonium compounds. In general, these silanol-containing organopolysiloxanes contain an average of from about 1.0 to 1.98 organic groups attached to silicon through silicon-carbon linkages, and contain an average of from 0.01 to 1 silicon-bonded hydroxyl groups per silicon atom. Alternatively, some of the silicon-bonded hydroxyl groups can be replaced with alkoxy groups provided that the composition contains a minimum of 0.01 hydroxyl groups per silicon atom. These compositions can be described as having the average formula (2) 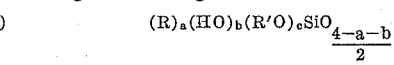

where R is a monovalent hydrocarbon radical or a substituted monovalent hydrocarbon radical, R' is an alkyl radical containing from 1 to 8 carbon atoms, $a$ has a value of from 1.0 to 1.98, $b$ have a value from 0.01 to 1, $c$ has a value of from 0 to 0.99, the sum of $b+c$ is from 0.01 to 1, and the sum of $a+b+c$ is from 1.01 to 2.1. Included among the radicals represented by R are, for example, alkyl radicals, e.g., methyl, ethyl, propyl, butyl, octyl, decyl, etc. radicals; aryl radicals, e.g., phenyl naphthyl, xylyl, tolyl, etc. radicals; aralkyl radicals, e.g., benzyl, phenyl-ethyl, styryl, etc. radicals; alkenyl radicals, e.g., vinyl, allyl, etc., radicals; cycloaliphatic hydrocarbon radicals, e.g., cyclohexyl, cycloheptyl, cyclohexenyl, etc. radicals; cyanoalkyl radicals, e.g., cyanoethyl, cyanomethyl, cyanopropyl, etc., radicals; halogenated monovalent hydrocarbon radicals, e.g., chloromethyl, bromomethyl, chloroethyl, chlorophenyl, tetrachlorophenyl, dibromophenyl, etc. radicals. In the preferred embodiment of our invention, at least 50% of the total radicals represented by R are methyl radicals.

While Formula 2 is an average formula for the silanol-containing organopolysiloxanes of the present invention, it should be remembered that this average formula can represent a mixture of two or more different types of organopolysiloxanes so long as each of the organopolysiloxanes which comprise the mixture contains at least two silicon-bonded hydroxyl or alkoxy groups per molecule. The presence of at least 2 silicon-bonded hydroxyl or alkoxy groups in each molecule is required so that condensation can occur between each of the molecules in the mixture forming the average composition of Formula 2.

The silanol-containing organopolysiloxanes of Formula 2 comprise a broad class of well known organopolysiloxane compositions. Included within the scope of Formula 2 are various resinous organopolysiloxanes including those resinous materials described in Patents 2,258,218 through 2,258,222, Rochow. The resinous organopolysiloxanes of the aforementioned Rochow patents are prepared by hydrolyzing one or more organochlorosilanes containing an average of from 1.0 to about 1.9 organic groups per silicon atom. During this hydrolysis reaction, the silicon-bonded chlorine atoms of the organochlorosilanes are hydrolyzed to form silanes containing silicon-bonded hydroxyl groups. Some of these hydroxyl groups condense with each other to eliminate water and form siloxane linkages. Other of the silicon-bonded hydroxyl groups remain intact and the resulting product is an organopolysiloxane resin containing silicon-bonded hydroxyl groups. For some applications it is desirable to "body" this partially condensed resinous product to condense additional silicon-bonded hydroxyl groups to siloxane groups, thereby reducing the number of silicon-bonded hydroxyl groups in the resinous product, but not completely eliminating these groups. It is the resinous materials in the aforementioned states of condensation which are curable by the curing catalyst system of the present invention. For a specific illustration of a group of organopolysiloxane resins containing silicon-bonded hydroxyl groups, reference is made to Patent 2,906,734, Clark.

Organopolysiloxane compositions within the scope of Formula 2 containing both silicon-bonded hydroxyl and alkoxy groups can be prepared by a number of methods. For example, a mixture of various organochlorosilanes can be hydrolyzed with water and partially condensed to produce an organopolysiloxane containing silicon-bonded hydroxyl groups. In general, this hydrolysis and condensation is effected by adding the mixture of organochlorosilanes to a mixture of water and an organic solvent, such as toluene, and agitating the mixture. The resulting organopolysiloxane containing silicon-bonded hydroxyl groups is found in the organic solvent phase which is separated from the aqueous phase. A suitable alcohol, such as an alkanol containing from 1 to 8 carbon atoms, is then added to the organopolysiloxane-organic solvent solution and heated at an elevated temperature, during which time the alkoxy groups replace some or most of the hydroxyl groups on the silicon atoms.

A still further method of preparing organopolysiloxanes containing both silicon-bonded hydroxyl and alkoxy groups is by condensing a mixture of organoalkoxysilanes with water to cause hydrolysis of a portion of the silicon-bonded alkoxy groups to hydroxyl groups and condensation of some of the hydroxyl groups.

Other organopolysiloxanes within the scope of Formula 2 are the resinous organopolysiloxanes composed of $R_3SiO_{.5}$ units and $SiO_2$ units, where R is as previously defined in the ratio of from 0.5 to 1.0 $R_3SiO_{.5}$ unit per $SiO_2$ unit, which resinous copolymers are described in Patents 2,736,721, Dexter; 2,814,601, Currie, and 2,857,356, Goodwin. These copolymers are prepared by hydrolyzing a hydrolyzable triorganosilane such as trimethylchlorosilane with an alkyl orthosilicate such as ethyl orthosilicate or the partial hydrolyzate of such alkyl orthosilicate. During the cohydrolysis of these two materials in the presence of a minor amount of water, the silicon-bonded chlorine and most of the silicon-bonded alkoxy groups are replaced by silicon-bonded hydroxyl groups through which the two organosilicon materials condense to form siloxane linkages.

Other compositions within the scope of Formula 2 which are applicable in the process of the present invention are the mixtures of 0.2 to 5 parts by weight copolymer of $R_3SiO_{.5}$ units and $SiO_2$ units with one part by weight of a polydiorganosiloxane containing silicon-bonded hydroxyl or alkoxy groups at the ends of the chains, such materials being disclosed in part in the aforementioned Dexter and Currie patents. Still another type of organopolysiloxane within the scope of Formula 2 is the material described in the aforementioned Goodwin patent which comprises the reaction product of a hydroxyl chain-stopped polydiorganosiloxane and the aforementioned copolymer of $R_3SiO_{.5}$ units and $SiO_2$ units.

A still further type of organopolysiloxane within the scope of Formula 2 which can be cured by the catalyst system of the present invention is the room temperature curing organopolysiloxane composition described and claimed in Patent 2,843,555, Berridge, which composition comprises a hydroxyl chain-stopped polydiorganosiloxane and an alkyl orthosilicate or a partial hydrolyzate of the alkyl orthosilicate. Instead of employing the alkyl orthosilicate or its hydrolysis product in the composition of the Berridge patent, the composition can contain a hydroxy alkyl orthosilicate of partial hydrolysis product thereof.

The organic compounds and compositions containing epoxide groups which are useful in the practice of the present invention are also well known in the art and include the simple epoxide compounds as well as resinous materials containing epoxide groups. Insofar as applicants are aware, there are no limitations on the type of epoxide compound applicable to the present invention except that the epoxide compound should not contain a functional group which interferes with the organopolysiloxane composition. Thus, the preferred epoxide compounds and compositions employed in the practice of the present invention are those in which the epoxide group is the only functional group or reactive group in the compound or composition. One type of epoxide compound which is particularly useful in the practice of the present invention is the glycidyl ether. These glycidyl ethers include, for example, methyl glycidyl ether, ethyl glycidyl ether, propyl glycidyl ether, butyl glycidyl ether, phenyl glycidyl ether, allyl glycidyl ether, etc. In general, these glycidyl ethers can be represented by the formula (3) 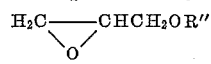

where R″ represents a monovalent hydrocarbon radical. Included within the scope of the R″ group are alkyl radicals, preferably lower alkyl radicals containing from 1 to 8 carbon atoms, as well as aryl radicals such as phenyl, naphthyl, tolyl, xylyl, etc. Other simple epoxy compounds useful in the practice of the present invention include, for example, styrene oxide, cyclohexene oxide and derivatives thereof and the diglycidyl ether of 1,3-bis-hydroxypropyltetramethyldisiloxane. More complex types of epoxide materials useful in the practice of the present invention are the resinous reaction products of epichlorohydrin and various dihydric aromatic compounds. In particular, one useful and commercially available resinous epoxide-containing material is the resinous reaction product of epichlorohydrin and bis-p,p′-hydroxyphenyldimethylmethane. In addition to this particular resinous reaction product, other suitable epoxy-containing resins are prepared from polyfunctional halohydrins and other dihydric phenols such as described in Patent 2,521,-911, Greenlee. The various polyhydric phenols and in particular the compounds known as "bis-phenols" can be prepared by methods described in Patent 2,182,308, Britton et al.

The epoxy compounds and compositions described above may be characterized broadly as having the formula (4) 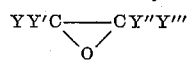

where Y, Y′ and Y″ are members selected from the class consisting of hydrogen and monovalent organic radicals, preferably radicals free of functionality other than the epoxide function, and Y‴ is a monovalent organic radical having at least 2 carbon atoms, preferably free of aliphatic unsaturation and functionality other than the epoxy function, and further members where Y and Y″ taken together form a divalent organocyclic radical containing at least 3 carbon atoms.

The amines within the scope of the catalyst system of the present invention include all of those primary, secondary and tertiary amines which are well known to the art. In general, these primary, secondary and tertiary amines have the formula (5) 

where Z and Z′ are members selected from the class consisting of hydrogen and monovalent organic radicals and Z″ represents a monovalent organic radical and further members where Z′ and Z″ taken together represent carbocyclic and heterocyclic divalent organic radicals. Included within the scope of the amines of Formula 5 can be mentioned, for example, compounds such as aniline, butyl amine, soya amine, 1,3-dimethylbutyl amine, dimethyl amine, dibutyl amine, dioctyl amine, diphenyl amine, trimethyl amine, tributyl amine, trioctyl amine, benzyldimethyl amine, N-methylaniline, N-methyl soya amine, N,N-dimethyl soya amine, N,N-dimethylbenzyl amine, N-methylmorpholine, pyridine, N-methyl pyridine, piperazine, piperidine, picoline, pipecoline, N,N'-dimethylethylene diamine, tetramethyl guanidine, etc.

In carrying out the proces of the present invention to form a curable organopolysiloxane composition and to cure the composition, the silanol-containing organopolysiloxane of Formula 2 along with various fillers or stabilizing agents, where such extra materials are desired, are merely mixed with the epoxide compound and the primary, secondary or tertiary amine. Depending on the particular reactants employed, the mere mixing of the siloxane with the epoxy compound and the amine often forms a composition which will cure at room temperature. In other cases, elevated temperatures are used to facilitate the curing.

While the exact mechanism of the curing reaction of the present invention is not known with certainty, it is known that the epoxide component of the curing system alone has no detectable effect on the curing of the silanol-containing organopolysiloxanes. Furthermore, while a minor degree of curing of the silanol-containing organopolysiloxane is found with the primary, secondary or tertiary amine, the rate of cure with both the amine and the epoxide compound present is much faster than the rate observed when the amine alone is employed.

Because there is a tendency for the curable compositions of the present invention to begin curing even at room temperature with many of the catalyst systems within the present invention, it is often desirable to add both the primary, secondary or tertiary amine and the epoxy compound to the silanol-containing organopolysiloxane at the time at which the composition is to be cured. By following this procedure an almost indefinite shelf life of the silanol-containing organopolysiloxane is obtained. On the other hand, it is often desirable to form a mixture of the silanol-containing organopolysiloxane and the epoxide composition and to delay the addition of the primary, secondary or tertiary amine until the composition is to be cured. By this procedure, only one component of the two component catalyst system need be added at the point of use. In still other cases, where the ratio of silicon-bonded hydroxyl groups to silicon atoms is low, it is possible to add both the epoxide composition and the primary, secondary or tertiary amine to the organopolysiloxane and still have a shelf life which can range up to a week or two.

The exact method of adding the components of the catalyst system to the silanol-containing organpolysiloxane and the exact method of curing the resulting catalyzed composition will be obvious to those skilled in the art and, of course, depends on the particular organopolysiloxane employed. For example, when the silanol-containing organopolysiloxane is present as a solution of the organopolysiloxane in an organic solvent, is is often desirable to add both components of the curing catalyst system to the solution and then evaporate the solvent from the solution. In general, this solvent evaporation is effected under reduced pressures at temperatures below about 50 to 60° C. so as to insure removal of the solvent prior to the curing of the organopolysiloxane. Solvents in which various silanol-containing organopolysiloxanes are often found include toluene, xylene, mineral spirits, butanol, isopropanol, etc. In those cases where the silanol-containing organopolysiloxane contains no solvent but is a liquid, it is convenient to merely mix the two components of the catalyst system into the liquid organopolysiloxane composition and then maintain this composition at the temperature at which curing is to be effected, whether this temperature is at room temperature or at some elevated temperature such as a temperature of the order of from 50 to 125° C. Where the silanol-containing organopolysiloxane is an extremely viscous material which is free of solvent, it is often desirable to mill the components of the catalyst system into the organopolysiloxane at room temperature or at some temperature slightly above room temperature so as to form a uniform mixture or dispersion of all of the ingredients in the catalyzed composition. This catalyzed composition can then be cured at room temperature or at some elevated temperature, such as a temperature of from 50 to 125° C. or more, if an accelerated rate of cure is desired.

Where fillers or extenders are desired to be used with the silanol-containing organopolysiloxanes of Formula 2, these fillers or extenders are merely added to the organopolysiloxanes in accordance with the procedures known in the prior art. Suitable fillers and extenders for use in these various organopolysiloxane compositions include various finely divided silicas such as fumed silica, precipitated silica and silica aerogel. Also useful as fillers are carbon black, diatomaceous earth, calcium carbonate, finely divided mica, fuller's earth, etc. Often, mixtures of two or more different fillers or extenders are added to these organopolysiloxane compositions. These fillers or extenders are usually employed in an amount equal to about 20 to 200 percent, based on the weight of the organopolysiloxane. When the organopolysiloxane compositions contain these fillers or extenders, the fillers or extenders and the epoxide and the amine can be added to the organopolysiloxane simultaneously or in any order desired. Preferably, however, one of the two components of the catalyst system is the last ingredient added to the composition.

The amount of the primary, secondary or tertiary amine and the epoxy compound used for curing the silanol-containing siloxanes can vary within extremely wide limits. However, it has been found that satisfactory rates of curing are obtained when the total amount of both the amine and the epoxy compound is equal to from about 0.05 to 5 percent by weight, based on the weight of the organopolysiloxane. Higher proportions of the catalyst system can be employed but no particular advantage is derived therefrom. It has also been found that satisfactory curing is obtained when the epoxy compound and the amine are present in substantially equimolar amounts so as to provide approximately one epoxide group per nitrogen atom in the curing system. However, satisfactory curing is obtained when either the amine or the epoxide is present in substantial molar excesses such that there are present from about 0.2 to 5 moles of epoxide groups per gram atom nitrogen. When larger excesses of either ingredient is employed, the added excess ingredient has no beneficial effect on the cure rate.

The following examples are illustrative of the practice of my invention and are not intended for purposes of limitation.

EXAMPLE 1

This example illustrates the catalyzation of a particular methylphenylpolysiloxane resin with various amines and with various epoxide compositions and the curing of these catalyzed materials. In particular, the methylphenylpolysiloxane resin was a 60% solids solution in toluene of a resinous copolymer of 10 mole percent methylsiloxane units, 20 mole percent phenylsiloxane units, 40 mole percent dimethylsiloxane units and 30 mole percent diphenylsiloxane units and contained approximately 3.2% by weight, based on resin solids, of hydroxyl groups, which is equivalent to about 0.2 hydroxyl groups per silicon atom. To this resinous solution was added varying amounts of N,N-dimethyl soya amine (DMSD) or N,N-dimethylbenzyl amine (DMBA) or N-methylmorpholine (MM) and varying amounts of phenyl glycidyl ether (PGE) or a commercial epichlorohydrin bis-phenol resin sold under the tradename Epon 828 by the Shell Chemical Company (Epon). The DMSD for a commercial material sold under that name by Armour Industrial Chemical Company and comprises a mixture of soya oil acids in which the carboxyl groups are converted to amides which are then reduced to amines. The catalyzed material was maintained at the temperatures indicated in the table and the cure time was determined. The cure time was the time in which the catalyzed material was converted to a tack-free state. In Table I below are listed the weight percent of amine and epoxide employed in each run based on the weight of organopolysiloxane solids, the mole ratio of the amine compound to the epoxide, the cure temperature in degrees centigrade and the cure time.

Table I

| Run No. | Weight percent amine | Weight percent epoxide | Amine epoxide ratio | Cure temp., °C | Cure time |
|---|---|---|---|---|---|
| 1 | [1] 0.5 | 0 | | 160 | More than 20 hours. |
| 2 | 0 | [4] 0.5 | | 90 | No cure in 16 hours. |
| 3 | 0 | [4] 0.5 | | 125 | No cure in 20 hours. |
| 4 | [1] 0.5 | [4] 0.48 | 0.48 | 25 | Less than 16 hours. |
| 5 | [1] 0.62 | [4] 0.70 | 0.42 | 125 | Less than 1 hour. |
| 6 | [1] 1.1 | [4] 1.2 | 0.44 | 90 | One-half hour. |
| 7 | [2] 0.45 | [4] 0.50 | 1.0 | 125 | Less than 1 hour. |
| 8 | [3] 0.5 | [4] 0.31 | 1.0 | 125 | 4 hours. |
| 9 | [1] 0.25 | [5] 1.0 | 0.08 | 100 | Less than 1 hour. |

[1] DMSD.  [2] DMBA.  [3] MM.  [4] PGE.  [5] Epon.

As shown in Table I above, in Run No. 1, where no epoxide material was present, the resinous material took more than 20 hours at 160° C. for cure. As shown in Run 2, where no amine was employed but where the epoxide compound was employed, there was no cure in 16 hours at 90° C. From Run No. 3, it is shown that when the temperature of the formulation of Run No. 2 was maintained at 125° C., no cure was obtained in 20 hours. In contrast to this, Run No. 4 shows that when both the amine and the epoxide are present, cure takes place at 25° C. in less than 16 hours. Runs 5 through 9 show other rapid cures of the resin with various concentrations of various amines and with various epoxide materials in very short times as compared with the materials employed in Runs Nos. 1, 2 and 3.

EXAMPLE 2

This examples illustrates the catalysis and attempted catalysis of a methylphenylpolysiloxane with N,N-dimethyl soya amine or phenyl glycidyl ether or a mixture of the two aforementioned ingredients. The resin employed was a 60% solids solution in toluene of a resin consisting of 50 mole percent phenylsiloxane units and 50 mole percent dimethylsiloxane units which contained 6.1 percent by weight of silicon-bonded hydroxyl groups, which corresponds to about 0.36 group per silicon atom. Following the procedure of Example 1, an attempt was made to catalyze this resin with 0.48 percent dimethyl soya amine, based on the weight of the silicone resin solids. No cure was obtained after this amine-containing resin was maintained at a temperature of 80° C. for three hours. When an attempt was made to catalyze the resin with 0.49 percent by weight of phenyl glycidyl ether, no cure was observed at the end of 3 hours at 80° C. In contrast to these negative results, when both 0.48 percent of the amine and 0.49 percent of the phenyl glycidyl ether were employed, providing 0.47 mole of the amine per mole of the epoxide, cure was effected in less than 1 hour at 80° C.

EXAMPLE 3

Following the procedure and proportions of ingredients of Example 2, curing tests were made on a methylphenyl-polysiloxane resin which comprised a 35 percent solids solution in toluene of a resin consisting of 90 mole percent methylsiloxane units and 10 mole percent dimethylsiloxane units. This resin contained 0.5 weight percent silicon-bonded hydroxyl groups and 0.01 weight percent silicon-bonded butoxy groups which corresponds to about 0.02 hydroxyl group per silicon atom and about 0.005 butoxy group per silicon atom. With either the dimethyl soya amine alone or the phenyl glycidyl ether alone, no cure was obtained after 3 hours at 80° C. In contrast to this, when both the dimethyl soya amine and the phenyl glycidyl ether were employed, cure was effected in less than one hour at 80° C.

EXAMPLE 4

Following the procedures and proportions of ingredients of Examples 2 and 3, attempts were made to cure with either dimethyl soya amine or phenyl glycidyl ether alone or with both the amine and the epoxide a 60 percent solids resin solution in xylene. The resin comprised 20 mole percent methylsiloxane units, 40 mole percent phenylsiloxane units, 20 mole percent dimethylsiloxane units and 20 mole percent diphenylsiloxane units. This resin contained 4.6 percent by weight of silicon-bonded silanol groups which corresponds to about 0.32 hydroxyl groups per silicon atom. As with Examples 2 and 3, when either the amine or the epoxide compound alone was employed, no curing was obtained at the end of 3 hours at 80° C. When both the amine and the epoxide were employed as curing agents, cure was effected in less than 1 hour.

EXAMPLE 5

This example illustrates the curing of an organopolysiloxane within the scope of Formula 2 in which the organopolysiloxane contains 2 components. A mixture was prepared from 100 parts of a silanol chain-shopped dimethylpolysiloxane containing about 0.01 hydroxyl group per silicon atom and 2 parts of a partial hydrolysis and condensation product of ethyl orthosilicate which contained an averge of about 4 silicon atoms per molecule. In particular, this product is the commercial material sold under the name Ethyl Silicate 40 by the Union Carbide Corporation. To this mixture was added various amounts of various amines and epoxide compositions and attempts were made to cure these various formulations at different temperatures. In Table II below are listed the particular amine employed and the weight percent of the amine based on the weight of the silanol chain-stopped dimethylpolysiloxane, the particular epoxide composition employed and its weight percent, the moles of amine per mole of epoxide, the curing temperature and the cure time. The amines employed were N,N-dimethyl soya amine (DMSD), dibutyl amine ($Bu_2NH$), morpholine (MORPH.), dimethylbenzyl amine (DMBA) and tetramethyl guanidine (TMG). The epoxides employed were phenyl glycidyl ether (PGE), Sylkem 90 (Sylkem), the diglycidyl ether of 1,3-bis-hydroxypropyltetramethyldisiloxane marketed by Dow Corning Corporation, styrene oxide, EP–201 which is 3,4-epoxy-6-methyl - cyclohexylmethyl - 3',4' - epoxy-6'-methylcyclohexane carboxylate and Araldite 6010 (Araldite), a resinous reaction product of epichlorohydrin and "bisphenol" marketed by the Ciba Chemical Company. The organopolysiloxane composition contained an average of about 1.98 silicon-bonded methyl groups and about 0.01 hydroxyl groups and about 0.02 ethoxy groups per silicon atom. This solvent-free composition was maintained at either room temperature or the desired elevated temperature and the time required for the material to convert from a liquid to a rubbery polymer was taken as the cure time. The initial material had a viscosity of about 3,000 centipoises when measured at 25° C.

Table II

| Run No. | Weight percent amine | Weight percent epoxide | Amine epoxide ratio | Curing Temp., °C. | Cure time |
|---|---|---|---|---|---|
| 10 | 0.18 DMSD | 0 | | 25 | No cure in 24 hours. |
| 11 | 0.99 DMSD | 0.5 PGE | 0.95 | 25 | Less than 15 hours. |
| 12 | 0.5 Bu₂NH | 0.5 PGE | 1.0 | 25 | 10 hours. |
| 13 | 0.78 MORPH | 0.5 PGE | 2.7 | 25 | 14 hours. |
| 14 | 0.45 DMBA | 0.5 PGE | 1.0 | 25 | 24 hours. |
| 15 | 0.5 DMSD | 0.6 Sylkem | 0.48 | 25 | Less than 20 hours. |
| 16 | 0.64 DMSD | 0.31 Styrene oxide | 0.79 | 25 | Less than 15 hours. |
| 17 | 0.78 DMSD | 0.45 EP-201 | 0.77 | 25 | Less than 15 hours. |
| 18 | 0.5 DMBA | 0.45 Styrene oxide | 0.99 | 80 | 8 hours. |
| 19 | 0.5 DMBA | 0.56 PGE | 0.99 | 80 | 2 hours. |
| 20 | 0.5 DMBA | 0 | | 80 | No cure in 10 hours. |
| 21 | 0.07 TMG | 1.0 Araldite | 0.06 | 25 | 12 hours. |
| 22 | 0.04 TMG | 0.14 Styrene oxide | 0.33 | 25 | 20 minutes. |

When the procedure of this example was repeated except that the silanol-containing dimethylpolysiloxane contained 4 parts of the ethyl silicate hydrolyzate per 100 parts of the silanol chain-stopped dmethylpolysiloxane, results comparable to those in Table II are obtained.

EXAMPLE 6

A room temperature vulcanizing silicone rubber formulation was prepared according to the procedure of Example 1 of the aforementioned Patent 2,843,555, Berridge, by mixing 100 parts by weight of a silanol chain-stopped dimethylpolysiloxane containing an average of 0.02 hydroxyl group per silicon atom, 2 parts of the partial hydrolyzate of ethyl silicate sold under the trade name Ethyl Silicate 40, 20 parts diatomaceous earth, 20 parts finely divided zinc oxide and 30 parts calcined clay. To this mixture of ingredients was added 0.99 percent by weight N,N-dimethyl soya amine and 0.50 percent phenyl glycidyl ether based on the weight of the silanol chain-stopped dimethylpolysiloxane, giving a ratio of 0.48 mole amine per mole of epoxide. This composition cured to a firm rubber in less than 15 hours at room temperature (25° C.).

EXAMPLE 7

This example illustrates the curing of an organopolysiloxane potting gel of the type described in the copending application of Frank J. Modic, Serial No. 79,555, filed concurrently herewith and assigned to the same assignee as the present invention. Following the procedure of the aforementioned Goodwin patent, trimethylchlorosilane and ethyl orthosilicate were reacted to form a copolymer of trimethylsiloxane units and SiO₂ units in which the ratio of trimethylsiloxane units and SiO₂ units was 0.5 to 1. Sixty parts by weight of this copolymer was dissolved in 40 parts xylene and mixed with 300 parts by weight of a silanol chain-stopped dimethylpolysiloxane containing an average of 0.03 hydroxyl group per silicon atom. This mixture was heated at a temperature of about 40° C. under a reduced pressure of 100 millimeters to remove approximately 99 percent of the xylene solvent, resulting in a liquid flowable material having a viscosity of about 2,000 centipoises when measured at 25° C. and containing an average of about 0.025 hydroxyl group per silicon atom. To 100 parts of this terpolymer were added 0.25 part of N,N-dimethyl soya amine and 0.25 part butyl glycidyl ether. This catalyzed liquid was then cast around a printed circuit board and the entire cast assembly was maintained in a circulating air oven at a temperature of 80° C. for 10 hours. At the end of this time, the organopolysiloxane had cured to a firm, rubbery, transparent gel with sufficient resiliency to protect the circuit board assembly from mechanical shock and vibration. When the procedure of this example was repeated except that 0.25 part of 1,3-dimethylbutyl amine was substituted for the soya amine, a comparable cured product was obtained.

While the foregoing examples have illustrated a number of the variables within the scope of the present invention, it should be understood that our invention is directed broadly to the use of catalyst compositions comprising a primary, secondary or tertiary amine and an epoxide-containing material as a curing agent for the curing of organopolysiloxanes containing silicon-bonded hydroxyl groups. The organopolysiloxane compositions cured by the process of the present invention have the same utility as organopolysiloxanes cured by other methods known to the art. Thus, these materials can be employed as varnish for impregnating electrical apparatus, as insulation for electrical conductors, as gasket materials and as potting compounds for electrical and electronic apparatus.

What we claim and desire to secure by Letters Patent of the United States is:

1. A solid, cured product of a curable organopolysiloxane composition consisting essentially of (A) an organopolysiloxane containing silicon-bonded hydroxyl groups, (B) an amine selected from the class consisting of primary amines, secondary amines, and tertiary amines, and (C) an organic compound containing an epoxy group, said amine and said organic compound being present in an amount equal to from about 0.05 to 5% by weight, based on the weight of said organopolysiloxane, the organo groups of said organopolysiloxane being selected from the class consisting of monovalent hydrocarbon radicals, halogenated monovalent hydrocarbon radicals, and cyanoalkyl radicals, there being present from 0.01 to 1 silicon-bonded hydroxyl group per silicon atom in said organopolysiloxane and from 1.0 to 1.98 silicon-bonded organo groups per silicon atom with the total number of silicon-bonded hydroxyl groups and silicon-bonded organo groups per silicon atom being from 1.01 to 2.1, inclusive.

2. The product of claim 1 in which the amine is N,N-dimethyl soya amine.

3. The product of claim 1 in which the organic epoxide is phenyl glycidyl ether.

4. A solid, cured product of a curable composition consisting essentially of (A) an organopolysiloxane having the formula.

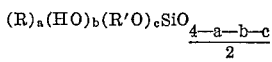

$$(R)_a(HO)_b(R'O)_c SiO_{\frac{4-a-b-c}{2}}$$

where R represents a member selected from the class consisting of monovalent hydrocarbon radicals, halogenated monovalent hydrocarbon radicals, and cyanoalkyl radicals, R' is a lower alkyl radical, $a$ has a value of from 1.0 to 1.98, inclusive, $b$ has a value of from 0.01 to 1, inclusive, $c$ has a value of from 0 to 0.99, the sum of $b+c$ is from 0.01 to 1, inclusive, and the sum of $a+b+c$ is from 1.01 to 2.1, inclusive, (B) an amine selected from the class consisting of primary amines, secondary amines, and tertiary amines, and (C) an organic compound containing an epoxide group, said amine and said organic compound being present in an amount equal to from about 0.05 to 5% by weight, based on the weight of said organopolysiloxane.

5. A product of claim 4 in which said organic compound containing an epoxide group has the formula:

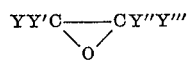

where Y, Y' and Y" are members selected from the class consisting of hydrogen and monovalent organic radicals free of functionality other than the epoxide function, Y''' is a monovalent organic radical having at least two carbon atoms and being free of aliphatic unsaturation and functionality other than the epoxy function and further members where Y and Y" taken together form a divalent organocyclic radical containing at least three carbon atoms.

6. A product of claim 4 in which the organic compound containing an epoxide group has the formula:

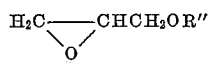

where R" represents a monovalent hydrocarbon radical.

7. A product of claim 4 in which said amine has the formula:

$$ZZ'Z''N$$

where Z and Z' are members selected from the class consisting of hydrogen and monovalent organic radicals and Z" represents a monovalent organic radical and further members where Z' and Z" taken together represent carbocyclic and heterocyclic divalent organic radicals.

8. A solid, cured product of a curable composition of matter consisting essentially of (A) an organopolysiloxane in which there are present from 1.0 to 1.98 organic groups per silicon atom selected from the class consisting of monovalent hydrocarbon radicals, halogenated monovalent hydrocarbon radicals, and cyanoalkyl radicals, and from 0.01 to 1 silicon-bonded hydroxyl group per silicon atom, with there being a total of from 1.01 to 2.1 total of said organic groups and said hydroxyl groups per silicon atom, (B) an amine selected from the class consisting of primary amines, secondary amines, and tertiary amines, and (C) an organic compound containing an epoxide group, said amine and said organic compound being present in an amount equal to from about 0.05 to 5% by weight, based on the weight of said organo-polysiloxane.

9. A solid, cured product of a curable composition of matter consisting essentially of (A) an organopolysiloxane containing an average of from 1.0 to 1.98 silicon-bonded methyl groups and from 0.01 to 1 silicon-bonded hydroxyl group, with there being a total of from 1.01 to 2.1 silicon-bonded methyl and hydroxyl groups, (B) an amine selected from the class consisting of primary amines, secondary amines, and tertiary amines, and (C) an organic compound containing an epoxide group, said amine and said organic compound being present in an amount equal to from about 0.05 to 5% by weight, based on the weight of said organopolysiloxane.

10. A solid, cured product of a curable composition consisting essentially of (A) a methylpolysiloxane containing an average of from 1.0 to 1.98 silicon-bonded methyl groups, from 0.01 to 1 silicon-bonded hydroxyl group, and a total of from 1.01 to 2.01 silicon-bonded methyl and hydroxyl groups, (B) from about 0.05 to 5% by weight N,N-dimethyl soya amine, and (C) from about 0.05 to 5% by weight phenyl glycidyl ether, said percents being based on the weight of said methylpolysiloxane.

11. A solid, cured product of a composition consisting essentially of (A) an organopolysiloxane having the formula:

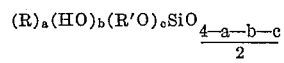

where R represents a member selected from the class consisting of monovalent hydrocarbon radicals, halogenated monovalent hydrocarbon radicals and cyanoalkyl radicals, R' is a lower alkyl radical, $a$ has a value of from 1.0 to 1.98, inclusive, $b$ has a value of from 0.01 to 1, inclusive, $c$ has a value of from 0 to 0.99, the sum of $b+c$ is from 0.01 to 1, inclusive, and the sum of $a+b+c$ is from 1.01 to 2.1, inclusive, (B) an amine having the formula:

$$ZZ'Z''N$$

where Z and Z' are members selected from the class consisting of hydrogen and monovalent organic radicals and Z" represents a monovalent organic radical and further members where Z' and Z" taken together represent carbocyclic and heterocyclic divalent organic radicals, and (C) an epoxy compound having the formula:

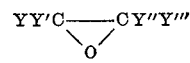

where Y, Y' and Y" are members selected from the class consisting of hydrogen and monovalent organic radicals free of functionality other than the epoxide function and Y''' is a monovalent organic radical having at least two carbon atoms and being free of aliphatic unsaturation and functionality other than the epoxy function and further members where Y and Y" taken together form a divalent organocyclic radical containing at least three carbon atoms, said amine and said epoxy compound being present in an amount equal to from about 0.05 to 5% by weight, based on the weight of said organopolysiloxane.

12. The process for curing an organopolysiloxane having the formula:

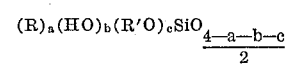

where R represents a member selected from the class consisting of monovalent hydrocarbon radicals, halogenated monovalent hydrocarbon radicals and cyanoalkyl radicals, R' is a lower alkyl radical, $a$ has a value of from 1.0 to 1.98, inclusive, $b$ has a value of from 0.01 to 1, inclusive, $c$ has a value of from 0 to 0.99, inclusive, the sum of $b+c$ is from 0.01 to 1, inclusive, and the sum of $a+b+c$ is from 1.01 to 2.1, inclusive, which process comprises admixing with said organopolysiloxane (A) an amine having the formula:

$$ZZ'Z''N$$

where Z and Z' are members selected from the class consisting of hydrogen and monovalent organic radicals and Z" represents a monovalent organic radical and further members where Z' and Z" taken together represent carbocyclic and heterocyclic divalent organic radicals and (B) an epoxy compound having the formula:

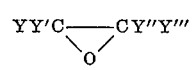

where Y, Y' and Y" are members selected from the class consisting of hydrogen and monovalent organic radicals free of functionality other than the epoxide function and Y''' is a monovalent organic radical having at least two carbon atoms and being free of aliphatic unsaturation and functionality other than the epoxy function and further members where Y and Y" taken together form a divalent organocyclic radical containing at least three carbon atoms, said amine and said epoxy compound being present in an amount equal to from 0.05 to 5% by weight, based on the weight of said organopolysiloxane.

13. The process of forming a solid, cured composition which comprises mixing a methylpolysiloxane with N,N-dimethyl soya amine and phenyl glycidyl ether, said methylpolysiloxane containing an average of from 1.0 to 1.98 silicon-bonded methyl groups, from 0.01 to 1 silicon-bonded hydroxyl group and a total of from 1.01 to 2.01 silicon-bonded methyl and hydroxyl groups, said amine and said ether being employed in an amount equal to from about 0.05 to 5% by weight, based on the weight of said methylpolysiloxane.

References Cited by the Examiner

UNITED STATES PATENTS

| | | | |
|---|---|---|---|
| 2,650,934 | 9/53 | Rust | 260—448.8 |
| 2,730,532 | 1/56 | Martin | 260—46.5 |
| 2,938,010 | 5/60 | Bluestein | 260—46.5 |
| 2,997,458 | 8/61 | Lewis | 260—46.5 |

LEON J. BERCOVITZ, *Primary Examiner.*

HAROLD BURSTEIN, LOUISE QUAST, WILLIAM SHORT, *Examiners.*